Patented Dec. 14, 1948

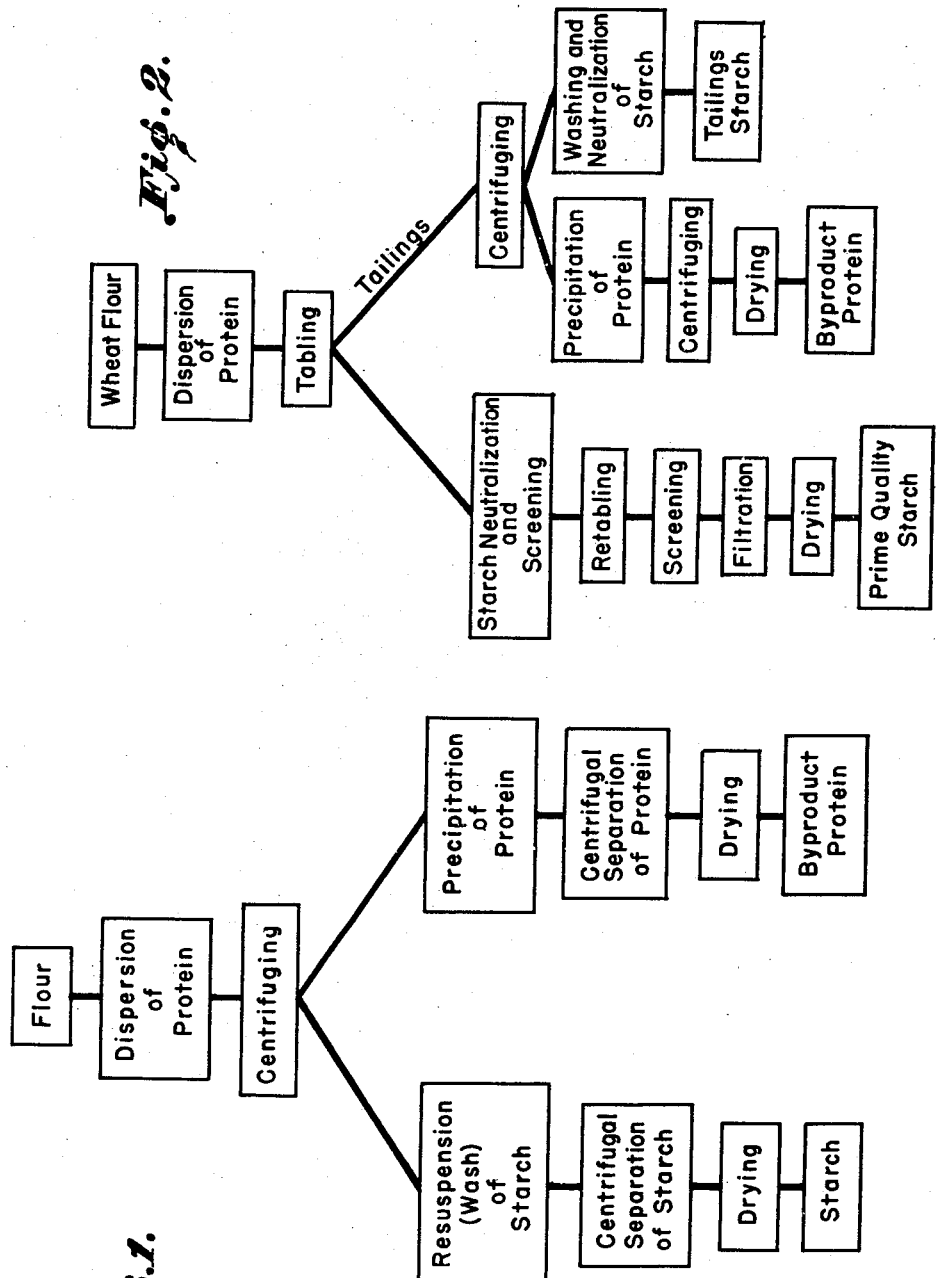

2,455,981

UNITED STATES PATENT OFFICE 2,455,981

ALKALI PROCESS FOR WHEAT STARCH PRODUCTION

Robert J. Dimler, Peoria, Ill., assignor to the United States of America as represented by the Secretary of Agriculture Application August 21, 1944, Serial No. 550,477

6 Claims. (Cl. 127—67)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to the production of starch from wheat flour.

About 98 percent of the starch produced in the United States is derived from corn. However, due to the utilization of corn for other purposes, especially at the present time, different sources of starch must be employed. However, although starch has heretofore been produced from cereals other than corn, it is not feasible to commercially process wheat in large scale operations for this purpose in accordance with the methods of the prior art.

The general objects of this invention are the provision of a method for producing starch from wheat which is adaptable to large scale commercial operations; which can be used with raw materials of varying quality, such as low-grade flour, flour of limited value for baking purposes, and flour from damaged grain that is unfit for food. In large scale operations, this invention may be geared into seasonal schedules of beet sugar factories. Such factories usually could be adapted readily to the production of starch in accordance with the method of this invention, and have much of the equipment for subsequent conversion of the starch to syrups or sugars. Such factories could, therefore, produce starch in accordance with this method with relatively few changes in equipment during the ordinary idle or slack periods between sugar campaigns, and thereby operate on a year-around basis.

This invention also has the advantage of permitting recovery of the protein component of the wheat which may be used for the production of monosodium glutamate, which is useful as a condiment.

In general, the process of this invention comprises treating wheat flour with an aqueous alkaline material, preferably aqueous sodium hydroxide, in order to effect essentially complete dispersion of the protein. Immediately after the protein dispersion, starch is gravity separated, either by centrifuging or tabling, depending upon the quality of the products desired. Centrifuging permits isolation of all the starch in a single fraction with a content of about 0.4 to 0.6 percent of protein, and other alkali-insoluble solids, which reduces the purity to about 94 to 98 percent. Tabling, on the other hand, yields a prime quality starch fraction equivalent to about 70 to 80 percent of the starch in the flour. The remainder of the starch may be recovered as a lower quality fraction having a protein content of about 0.4 to 0.7 percent and which is suitable for many conversion or fermentation uses.

In the protein-dispersion step, the alkalinity should be adjusted to about pH 10.6 to 11.8. On the basis of moisture-free flour, only about 6 to 12 parts of water are used in making the dispersion.

When centrifuging is employed, the separated starch is washed by resuspending it in water, then centrifuging again and drying, while the remaining material separated is acidified to about pH 5.0 to 6.0 to precipitate the protein. The precipitated protein is then separated, such as by centrifugation, and dried.

In the tabling process, the starch removed can be neutralized and screened, then retabled, screened, filtered, and dried, which results in the production of a prime quality starch. The tailings from the tabling are processed by centrifuging into fractions, one containing a protein and the other being starch that was not previously separated by the tabling step. The first fraction is then acidified to precipitate the protein and this is followed by centrifugation to separate the precipitated protein, the latter being then dried. The tailing starch is washed and neutralized and is suitable for conversion to glucose or malt syrups and for fermentation purposes in the wet state.

In order to illustrate more clearly the invention, there is shown in the accompanying drawing flow diagrams in which Figure 1 relates to the process utilizing centrifugal means for separating the dispersed protein from the starch, and Figure 2 to the use of the tabling method of separation.

Recycling of process liquors is advantageous in general practice. The alkaline liquor from the tailings of the first tabling can be used, with the addition of alkali, for the treatment of at least one further batch of flour before precipitating the protein. If a still higher concentration of alkali solubles is built up by several further recyclings, the protein fails to precipitate when the alkaline solution is acidified. The entire tailings from the retabling of the starch can be used for the primary treatment of another batch of flour, care being taken in the addition of the necessary alkali that the starch in the tailings is not gelatinized by local regions of high alkalinity.

Various alkaline materials may be used to effect the protein dispersion, such as sodium, potassium, calcium, and barium hydroxide, and sodium carbonate. However, maximum removal of the protein is effected by sodium or potassium hydroxide. If a relatively high protein content in the final product is not objectionable and can be tolerated for particular purposes, the use of calcium hydroxide offers the advantages of low cost and decreased danger of gelatinization in view of its limited water solubility. Maximum dispersion of the protein appears to be effected when the pH is at least 10.5. The dispersion can be effected substantially completely under favorable conditions in as short a time as ten minutes. Where optimum efficiency is not easily effected, such as in large scale operations, it is better to allow about 15 to 30 minutes for the dispersion to become effected.

In the protein-dispersion step, it is necessary to control the temperature so that little or no gelatinization of the starch will result. The operating temperature will depend upon the concentration of the alkali. Using sodium hydroxide as a typical example of alkali, it was found that at about 25° C. little or no gelatinization occurred when the normality of the alkali was about 0.1, using 10 grams of wheat flour to 100 grams of sodium hydroxide solution. Reduction of the normality of the alkaline permits an increase in the temperature, the relationship being substantially a straight line function. For example, at a normality of 0.08, a temperature of approximately 30° C. could be tolerated; at a normality of 0.06, about 37° C.; at a normality of 0.04, about 43° C.; and at a normality of 0.02, about 49° C.

For the tabling of starch from the alkaline wheat flour suspension, a concentration of one part flour in 12.5 parts of 0.03 N sodium hydroxide was found most practical, while for centrifuging, one part flour in 6 parts of 0.03 N sodium hydroxide could be used.

The following examples will further illustrate the invention:

EXAMPLE 1

150 grams (100 parts) of wheat flour on a moisture-free basis was mixed with 900 ml. of 0.03 N sodium hydroxide (0.75 parts sodium hydroxide in 600 parts of water) at between 25° and 35° C. with rapid stirring until all lumps of flour had disintegrated. The flour suspension (Baumé about 8.0) was introduced into an imperforate basket centrifuge, the transfer being completed with about 100 ml. of water. After the centrifuging was effected, the crude cake of starch was removed and resuspended in about 800 ml. of water with vigorous stirring and the suspension introduced into the centrifuge basket again. The resulting starch was dried at 40° C. in a mechanical convection oven.

The alkaline liquor from the first centrifugation was acidified to pH 5.5 with dilute sulfuric acid to precipitate the protein, which was then separated by centrifuging, then collected, and dried.

EXAMPLE 2

454 grams (100 parts) of wheat flour on a moisture-free basis was added to 5.7 liters of 0.3 N sodium hydroxide (1.5 parts NaOH in 1250 parts water) at 25° to 30° C. with rapid stirring. The resulting suspension (Baumé about 4.1) was run onto a starch table at a rate of about 170 ml. per minute, the size of the table being about ¼ of a foot by 12 feet with a pitch of ¼ inch in 10 feet. The tailings were run directly onto an imperforate basket centrifuge. One liter of water was then run onto the table at a rate of about 330 ml. per minute to displace the supernatant layer of alkaline liquor and to sweep away loose solids overlaying the starch cake on the table. The starch was removed from the table and the starch milk neutralized to pH 5.5 to 6.0 with dilute sulfuric acid and screened through No. 17 standard bolting silk. The starch milk, adjusted to a volume of about 3 liters (Baumé approximately 6.2), was tabled at a rate of about 330 ml. per minute. The tabled starch was resuspended with about 800 ml. of water, screened through silk as before, filtered by suction on a Buchner funnel, and dried.

The solids from the centrifugation of the first tabling tailings were washed twice by suspension in about one liter of water and centrifuged, the second washing being accompanied by neutralization to about pH 6.0 with sulfuric acid. Protein was precipitated from the alkaline liquor of the initial centrifuging of the first tailings in the same manner as in Example 1.

It will be understood that in the tabling process prime quality starch is deposited on the table while the suspension that passes over the end of the table, namely, the alkali liquor, contains protein and some starch. This latter starch is ordinarily referred to as tailings starch and in this process does not amount to more than about 20 to 30 percent of the total starch. As indicated above, the tailing starch may be used while still wet and it is desirable to use it in this condition with as little additional processing for purification as possible in view of the technical difficulties which would be encountered in such additional processing.

The following tables show the yields of products obtained from various flours in accordance with the method of this invention:

TABLE 1

*Yield of starch and protein from various flours— Centrifuge process [1]*

| Kind of flour | Crude starch | Washed starch [2] | | | Precipitated protein | | |
|---|---|---|---|---|---|---|---|
| | Protein content | Yield | Starch recovery | Protein content | Yield | Protein content | Protein recovery |
| | Percent | Lb./100 lb. flour | Percent | Percent | Lb./100 lb. flour | Percent | Percent |
| Rex soft white wheat | 0.9 | 86 | 101 | 0.3 | 6 | 70 | 63 |
| Commodity Credit Corporation hard red winter wheat | 1.7 | 83 | 101 | 0.4 | 10 | 87 | 71 |
| Commodity Credit Corporation dark northern spring wheat [3] | 2.7 | 82 | 100 | 0.4 | 11 | 85 | 65 |
| Thatcher hard red spring wheat [3] | 2.5 | 79 | 101 | 0.4 | 13 | 88 | 69 |
| Second clear (hard red spring wheat) [3] | 2.7 | 71 | 105 | 0.6 | 20 | 82 | 78 |
| Granular wheat | 3.1 | 81 | 98 | 1.1 | 9 | 87 | 62 |

[1] All data calculated on moisture-free basis.
[2] The nitrogen content of the starch is expressed, for uniformity, as protein, calculated as N×6.25 for corn and sorghum and N×5.7 for the other starches, although the nitrogenous material associated with the starch granules is quite different from the bulk of the flour protein. About 0.02 to 0.04 percent N (0.1 to 0.5 percent protein as calculated above) is apparently either incorporated in the starch granules or firmly adsorbed by it, since this is the lower limit of nitrogen in samples of cereal starches prepared by various methods.
[3] Starch centrifuged from suspension of 1 part flour in 6 parts 0.06 N. NaOH solution (instead of 0.03 N).

TABLE 2

Yield of starch and protein from various flours—Tabling process [1]

| Kind of flour | Tabled starch | | | First tailings starch | | | Precipitated protein | | |
|---|---|---|---|---|---|---|---|---|---|
| | Yield | Starch recovery | Protein content | Yield | Starch recovery | Protein content | Yield | Protein content | Protein recovery |
| *Laboratory runs* | Lb./100 lb. flour | Per cent | Per cent | Lb./100 lb. flour | Per cent | Per cent | Lb./100 lb. flour | Per cent | Per cent |
| American Banner soft white wheat | 67 | 83 | 0.2 | 14 | 16 | 0.5 | 8 | 77 | 57 |
| Rex soft white wheat | 59 | 73 | 0.2 | 18 | 19 | 0.5 | 4 | 70 | 39 |
| Commodity Credit Corporation hard red winter wheat | 57 | 72 | 0.3 | 16 | 19 | 0.4 | 9 | 84 | 57 |
| Thatcher hard red spring wheat | 55 | 72 | 0.3 | 18 | 22 | 0.5 | 11 | 90 | 62 |
| Commodity Credit Corporation dark northern spring wheat | 56 | 71 | 0.3 | 19 | 22 | 0.4 | 8 | 79 | 46 |
| Second clear (hard red spring wheat) | 44 | 68 | 0.2 | 21 | 26 | 0.7 | 16 | 84 | 65 |
| *Pilot Plant Run* | | | | | | | | | |
| Commodity Credit Corporation hard red winter wheat | 59 | 74 | 0.2 | 17 | 20 | 0.5 | 9 | 79 | 56 |

[1] All data calculated on moisture-free basis.

Having thus described my invention, I claim:

1. The process comprising treating wheat flour with 6 to 12 parts of an aqueous alkaline material per part of moisture-free flour at a pH of at least 10.5 and at a temperature below the temperature at which the starch gelatinizes to cause a homogeneous dispersion of the protein therein, and separating the starch granules from the liquid protein dispersion.

2. The process comprising treating wheat flour with 6 to 12 parts of an aqueous alkaline material per part of moisture-free flour at a pH of at least 10.5 and at a temperature below the temperature at which the starch gelatinizes to cause a homogeneous dispersion of the protein therein, and separating the starch granules from the liquid protein dispersion, acidifying the liquid protein dispersion to a pH of about 5.0 to 6.0 to precipitate the protein, and removing the precipitated protein.

3. The process comprising treating wheat flour with 6 to 12 parts of an aqueous alkaline material per part of moisture-free flour at a pH of at least 10.5 and at a temperature below the temperature at which the starch gelatinizes to cause a homogeneous dispersion of the protein therein, centrifuging to separate the starch granules from the alkali liquor containing the protein, removing the liquor and acidifying the liquid protein dispersion to about pH 5.0 to 6.0 to precipitate the protein, and removing the precipitated protein.

4. The process comprising treating wheat flour with 6 to 12 parts of an aqueous alkaline material per part of moisture-free flour at a pH of at least 10.5 and at a temperature below the temperature at which the starch gelatinizes to cause a homogeneous dispersion of the protein therein, tabling the resulting suspension to effect settling of the starch granules on the table, centrifuging the tailing to separate starch granules remaining therein from the liquid protein dispersion, removing the liquor and acidifying it to about pH 5.0 to 6.0 to precipitate the protein therein, and removing the precipitated protein.

5. The process comprising mixing wheat flour with 6 to 12 parts of an aqueous alkaline material per part of moisture-free flour, adjusting the alkalinity of the mixture to about 10.6 to 11.8, permitting the mixture to stand for about 10 to 30 minutes to cause a homogeneous dispersion of the protein therein, separating the starch granules, readjusting the remaining liquor to about pH 5.0 to 6.0 to precipitate the protein therein, and removing the precipitated protein.

6. The process comprising treating wheat flour with 6 to 12 parts of aqueous sodium hydroxide solution per part of moisture-free flour, said solution being within the range of 0.02 N to 0.1 N at a temperature below about 25° to 49° C., the lower normality corresponding to the higher temperature substantially in rectilinear relationship, permitting the mixture to stand for about 10 to 30 minutes to cause a homogeneous dispersion of the protein therein, and separating the starch granules from the liquid protein dispersion.

ROBERT J. DIMLER.

REFERENCES CITED

The following references are of record in the file of this patent:

UNITED STATES PATENTS

| Number | Name | Date |
|---|---|---|
| 253,923 | Hamlin | Feb. 21, 1882 |
| 260,736 | Becker | July 11, 1882 |
| 301,436 | Duryea | July 1, 1884 |
| 319,315 | Radenhausen | June 2, 1885 |
| 406,559 | Behr | July 9, 1889 |
| 810,086 | Rudel | Jan. 16, 1906 |
| 1,681,118 | Jaschke | Aug. 14, 1928 |

FOREIGN PATENTS

| Number | Country | Date |
|---|---|---|
| 102,465 | Germany | Apr. 5, 1899 |

OTHER REFERENCES

Radley, Starch and Its Derivatives, 2nd ed., N. Y., 1944, page 170.